(12) United States Patent
Renfro

(10) Patent No.: US 8,905,455 B2
(45) Date of Patent: Dec. 9, 2014

(54) DUAL-ACCESS VEHICLE DRAWER SYSTEM AND METHOD

(71) Applicant: Altec Industries, Inc., Birmingham, AL (US)

(72) Inventor: Naman Renfro, Spruce Pine, NC (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 13/731,495

(22) Filed: Dec. 31, 2012

(65) Prior Publication Data

US 2013/0313956 A1  Nov. 28, 2013

Related U.S. Application Data

(60) Provisional application No. 61/650,267, filed on May 22, 2012.

(51) Int. Cl.
| | |
|---|---|
| *B60R 9/00* | (2006.01) |
| *B60R 11/06* | (2006.01) |
| *A47B 88/16* | (2006.01) |
| *A47B 88/14* | (2006.01) |
| *B60P 1/00* | (2006.01) |

(52) U.S. Cl.
CPC .............. *A47B 88/14* (2013.01); *A47B 88/16* (2013.01); *B60P 1/00* (2013.01)
USPC ........ 296/37.6; 312/330.1; 312/286; 224/564

(58) Field of Classification Search
USPC ................... 296/10, 24.44, 24.45, 37.1, 37.6; 312/107.5, 215, 242, 286, 321, 330.1, 312/332.1, 333, 334.1, 334.13; 224/281, 224/545, 548, 564
See application file for complete search history.

(56) References Cited

U.S. PATENT DOCUMENTS

| | | | | |
|---|---|---|---|---|
| 2,784,027 A | * | 3/1957 | Temp ........................... | 296/156 |
| 4,159,844 A | | 7/1979 | Weiner | |
| 4,249,295 A | | 2/1981 | Lance | |
| 4,573,731 A | * | 3/1986 | Knaack et al. ............... | 296/37.6 |
| 4,705,315 A | * | 11/1987 | Cherry ......................... | 296/37.1 |
| 4,917,430 A | * | 4/1990 | Lawrence .................... | 296/37.6 |
| 5,125,710 A | | 6/1992 | Gianelo | |
| 5,845,952 A | * | 12/1998 | Albertini et al. ............. | 296/37.6 |
| 5,895,086 A | | 4/1999 | Carico | |
| 5,897,154 A | * | 4/1999 | Albertini et al. ............. | 296/37.6 |
| 6,328,365 B1 | | 12/2001 | Adsit | |
| 6,443,544 B1 | | 9/2002 | Wolf et al. | |
| 7,219,941 B1 | * | 5/2007 | San Paolo et al. ........... | 296/37.6 |
| 7,543,873 B1 | | 6/2009 | Thornsberry | |
| 7,621,587 B1 | | 11/2009 | Hanser et al. | |
| 2006/0125269 A1 | * | 6/2006 | Kunz ........................... | 296/37.1 |
| 2007/0007784 A1 | * | 1/2007 | Doyle .......................... | 296/37.1 |
| 2008/0231066 A1 | | 9/2008 | Harrell | |
| 2009/0127305 A1 | * | 5/2009 | Ropp ........................... | 224/404 |
| 2010/0301721 A1 | * | 12/2010 | Nebel ........................... | 312/326 |
| 2011/0037286 A1 | * | 2/2011 | Nebel .......................... | 296/37.6 |

* cited by examiner

*Primary Examiner* — Glenn Dayoan
*Assistant Examiner* — Jason S Daniels
(74) *Attorney, Agent, or Firm* — Erise IP, P.A.

(57) ABSTRACT

A drawer system and method for carrying and transporting tools and equipment on a vehicle. In particular, embodiments of the present invention are directed to a drawer system mounted into the rear section of a utility truck and that includes a drawer that is accessible from either side of the truck. Further, the drawer system of the present invention includes multiple catch points that permit the drawer to be securely arranged in a plurality of preferred extension positions.

12 Claims, 13 Drawing Sheets

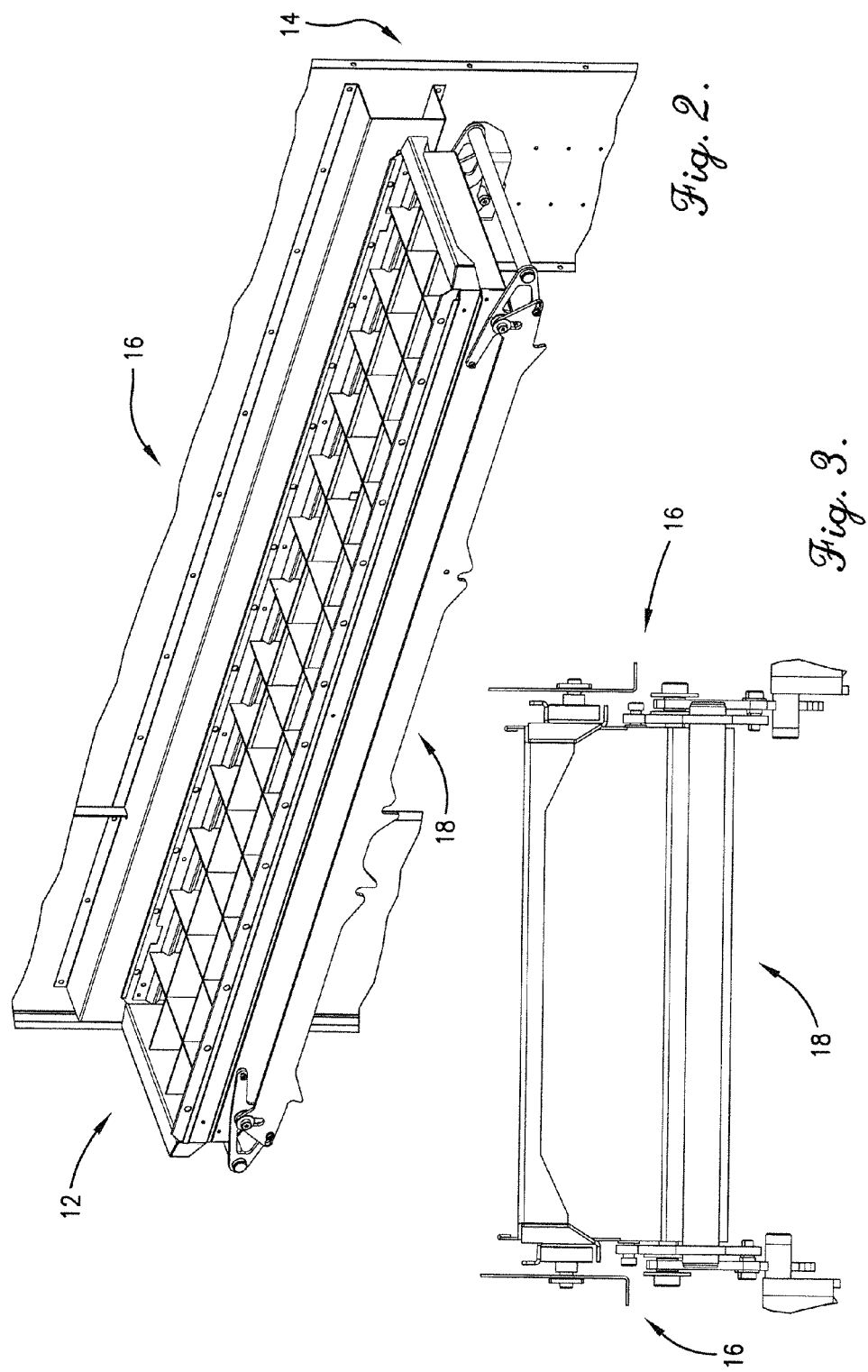

DUAL-ACCESS VEHICLE DRAWER SYSTEM AND METHOD

RELATED APPLICATIONS

This non-provisional patent application claims priority benefit with regard to all common subject matter of earlier-filed U.S. Provisional Patent Application No. 61/650,267 filed May 22, 2012, and entitled DUAL-ACCESS UTILITY TRUCK DRAWER SYSTEM. The earlier-filed provisional application is hereby incorporated by reference in its entirety into the present application.

BACKGROUND

1. Field

Embodiments of the present invention are directed to a drawer system and method for carrying and transporting tools and equipment on a vehicle. In particular, the embodiments are directed to a drawer system integrated into the rear section of a utility truck and that includes a drawer accessible from either side of the truck. Further, the drawer system of the present invention includes catch points that permit the drawer to be securely arranged in a plurality of extension positions.

2. Related Art

Utility trucks commonly incorporate the use of drawer systems to store and transport tools. Such drawer systems are generally integrated into the sides of the utility truck, usually within the truck's rearward section. Such configurations permit each side of the truck to hold several drawers. The drawers can be designed in various shapes and sizes to store and carry different types of tools and material. The length and width of utility trucks are natural constraints on drawer size.

Standard drawers generally have a length that is shorter than one-half the width of the truck. Because the drawers are normally positioned on opposite sides of the truck, this size restriction ensures that the drawers will not interfere with each other while in the closed position. This restriction also permits a user to access an individual drawer only from a side of the truck where the drawer is located. Thus, in order to access a first drawer located on a driver's side of the truck, the user must position himself on the driver's side. Alternatively, if the user needs to access a second drawer located on a passenger's side of the truck, the user must walk around to the passenger's side to access the drawer.

In addition, standard drawers are generally only secured, or latched in place, when in a fully retracted, or closed, position. For instance, if the utility truck is parked on an angled surface, the drawers can unexpectedly move or shift due to gravity. Such instability can pose security and safety hazards because of the size and weight of the tools that are generally carried by utility trucks.

SUMMARY

A drawer system in accordance with embodiments of the present invention comprises a track assembly and a drawer assembly. The track assembly including one or more brackets attached to a frame of the vehicle; a plurality of track rollers attached to the bracket; and one or more fixed stops attached to the frame of the vehicle. The drawer assembly including a drawer positioned transversely across generally the entire width of the vehicle and extendable out both a driver's side and a passenger's side of the vehicle; one or more track rails attached the drawer and positioned adjacent to the track rollers of the track assembly, such that the track rollers and track rails facilitate the extension and retraction of the drawer with respect to the vehicle; and one or more latch bars attached to the drawer, with the one or more latch bars including a plurality of catch points. The plurality catch points can engage with the one or more fixed stops to secure the drawer in one or more extension positions. In additional embodiments of the present invention, the plurality of catch points facilitates the drawer to be extended further away from the vehicle on the passenger's side than on the driver's side.

A method in accordance with an embodiment of the present invention comprises lifting a passenger's side latch handle of the drawer to disengage passenger's side exterior catch points of one or more latch bars from passenger's side fixed stops; pulling the passenger's side latch handle to extend the drawer from a fully retracted position out the passenger's side of the vehicle to one or more extension positions; upon reaching the one or more extension positions, engaging interior catch points of the one or more latch bars with the passenger's side fixed stops. A similar method can be used to extend the drawer out the driver's side of the vehicle; however, certain embodiments provide for the drawer to be extended further away from the vehicle on the passenger's side than on the driver's side.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

FIG. 2 is a fragmented perspective view of a drawer assembly engaging a frame assembly;

FIG. 3 is a side view of the drawer assembly of FIG. 2 positioned between components of a frame assembly;

Figure 1:
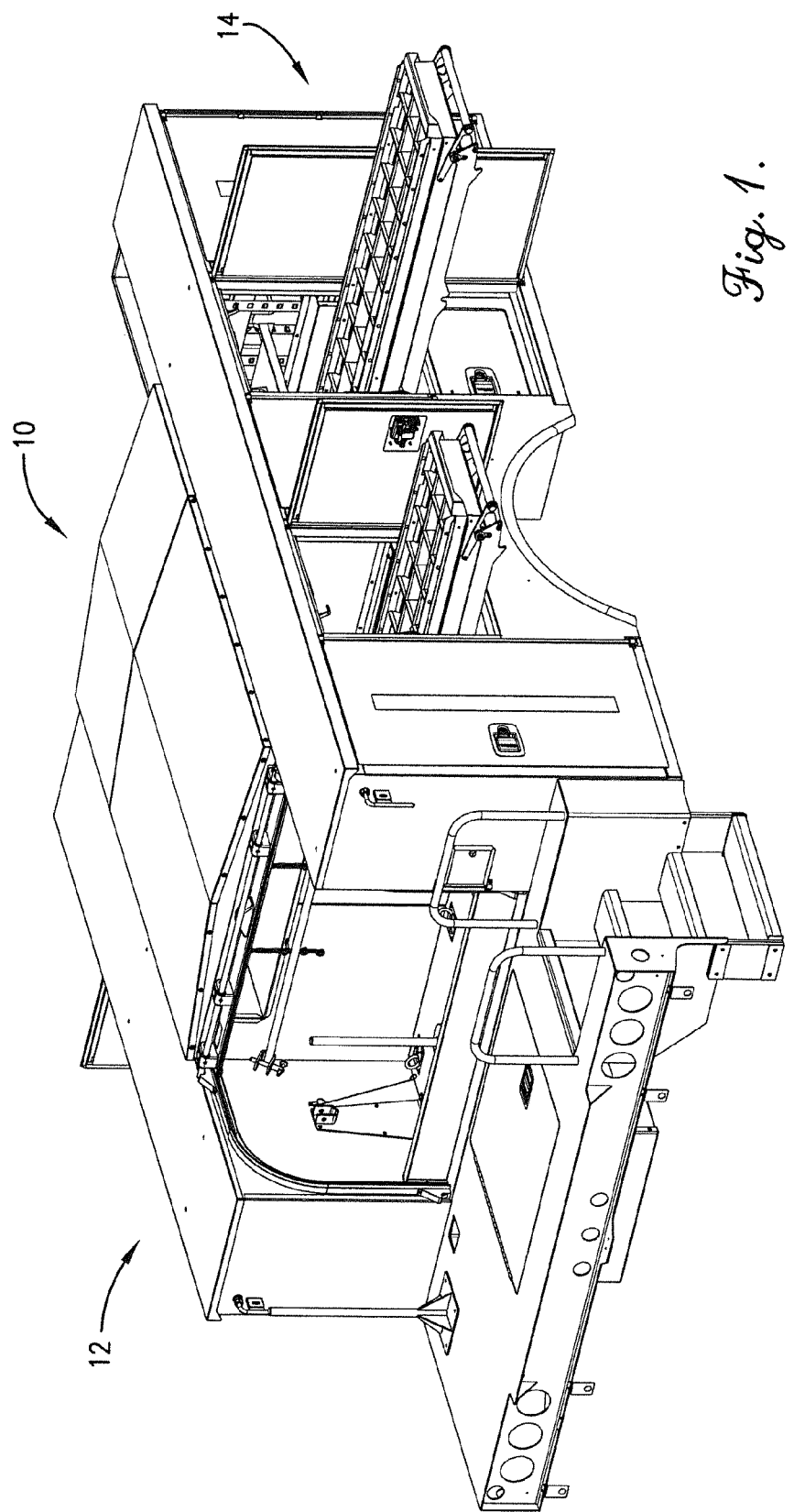
FIG. 1 is a rear perspective passenger's side view of an exemplary utility vehicle equipped with a tool compartment that includes one or more drawer systems of embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawings, an exemplary compartment unit 10 for a utility vehicle is illustrated in FIG. 1. Embodiments of the present invention may be utilized within a tool compartment unit such as illustrated in FIG. 1. However, embodiments may be utilized in vehicles with tool compartments different from that illustrated in FIG. 1. For instance, embodiments of the present invention may be utilized within a utility vehicle without an enclosed tool compartment, such as an open, flat-bed style vehicle. As is further illustrated in FIG. 1, the compartment unit 10 may include one or more drawer systems with drawers that can extend from the compartment unit 10 to various levels of extension from both a driver's side 12 and a passenger's side 14 of the vehicle, as will be more fully described below.

Figure 4:
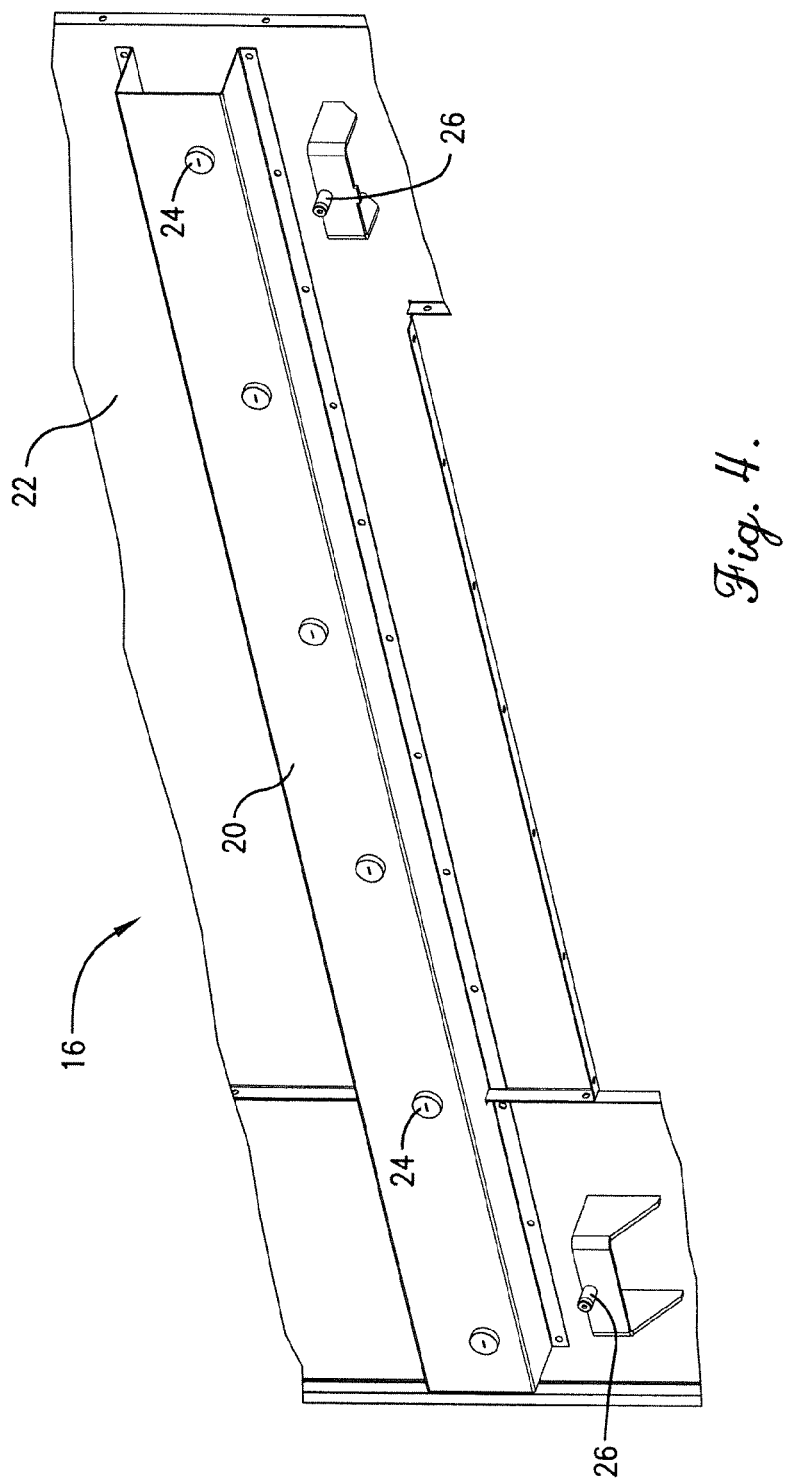
FIG. 4 is a fragmented perspective view of a frame assembly of a drawer system of embodiments of the present invention, with one or more brackets, a plurality of rollers, and one or more fixed stops.
Figure 5:
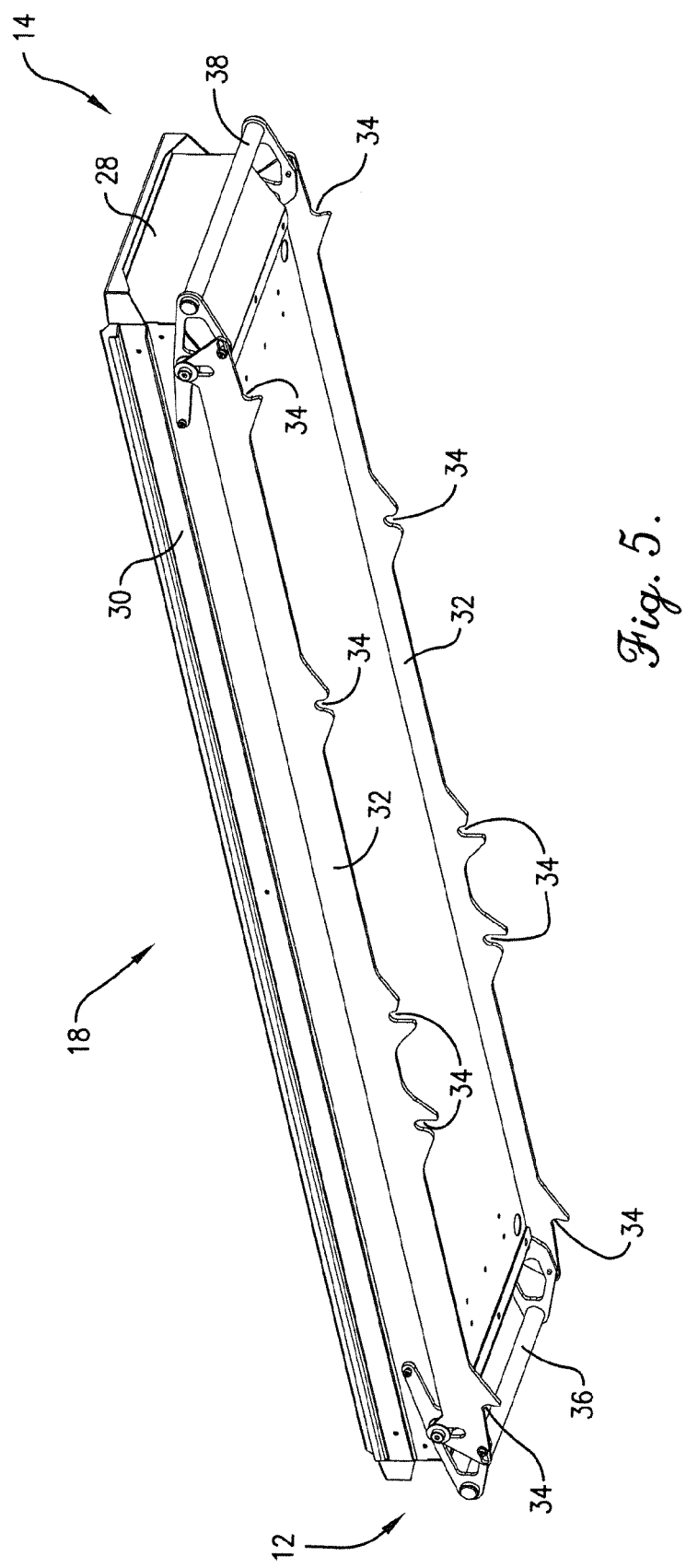
FIG. 5 is a perspective view of a drawer assembly of a drawer system of embodiments of the present invention, with a drawer, one or more track rails, and one or more latch bars.
Figure 6:
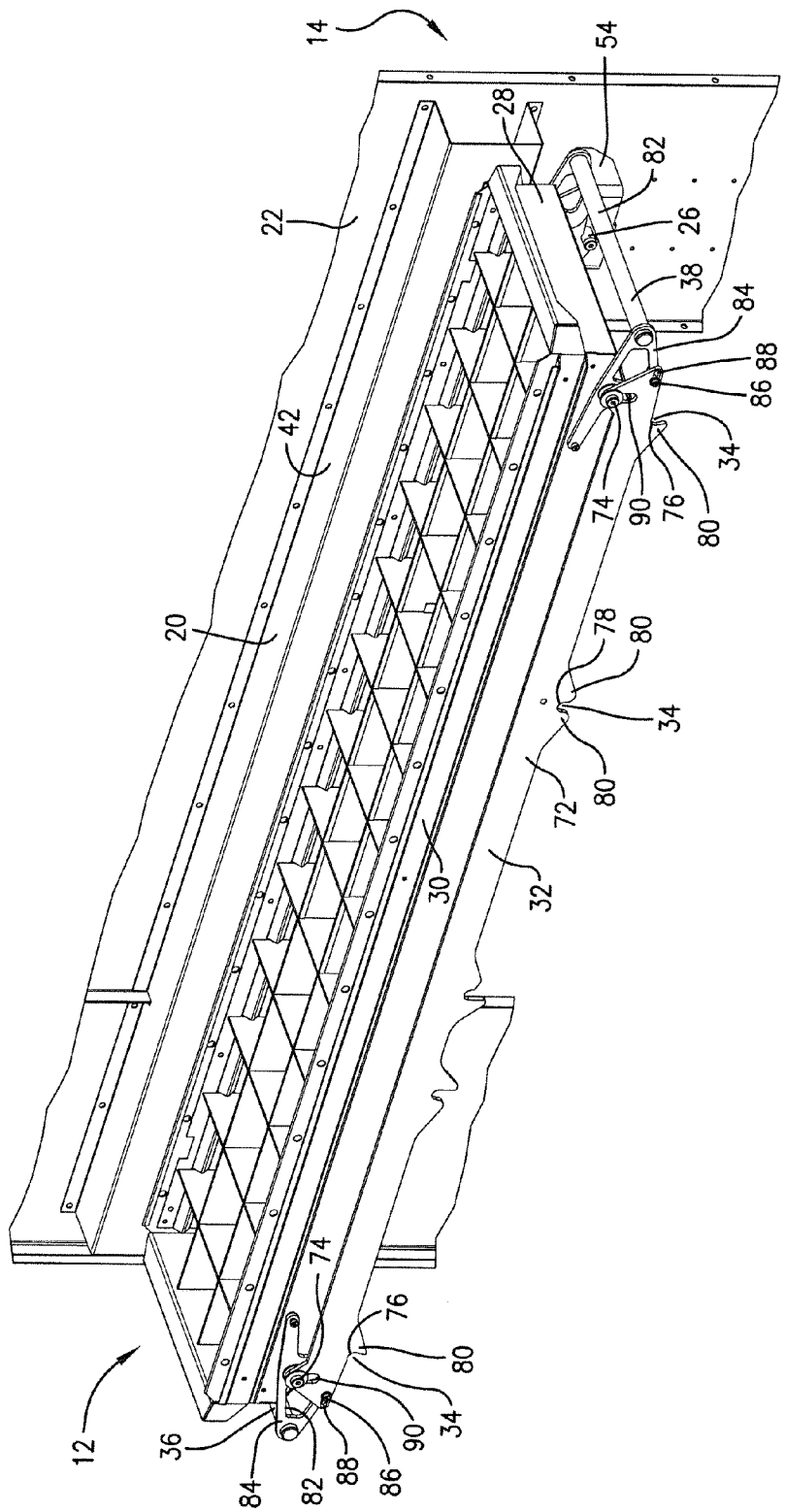
FIG. 6 is a top viewing fragmented perspective of the drawer assembly of FIG. 5 illustrated engaging the frame assembly of FIG. 4.
Figure 7:
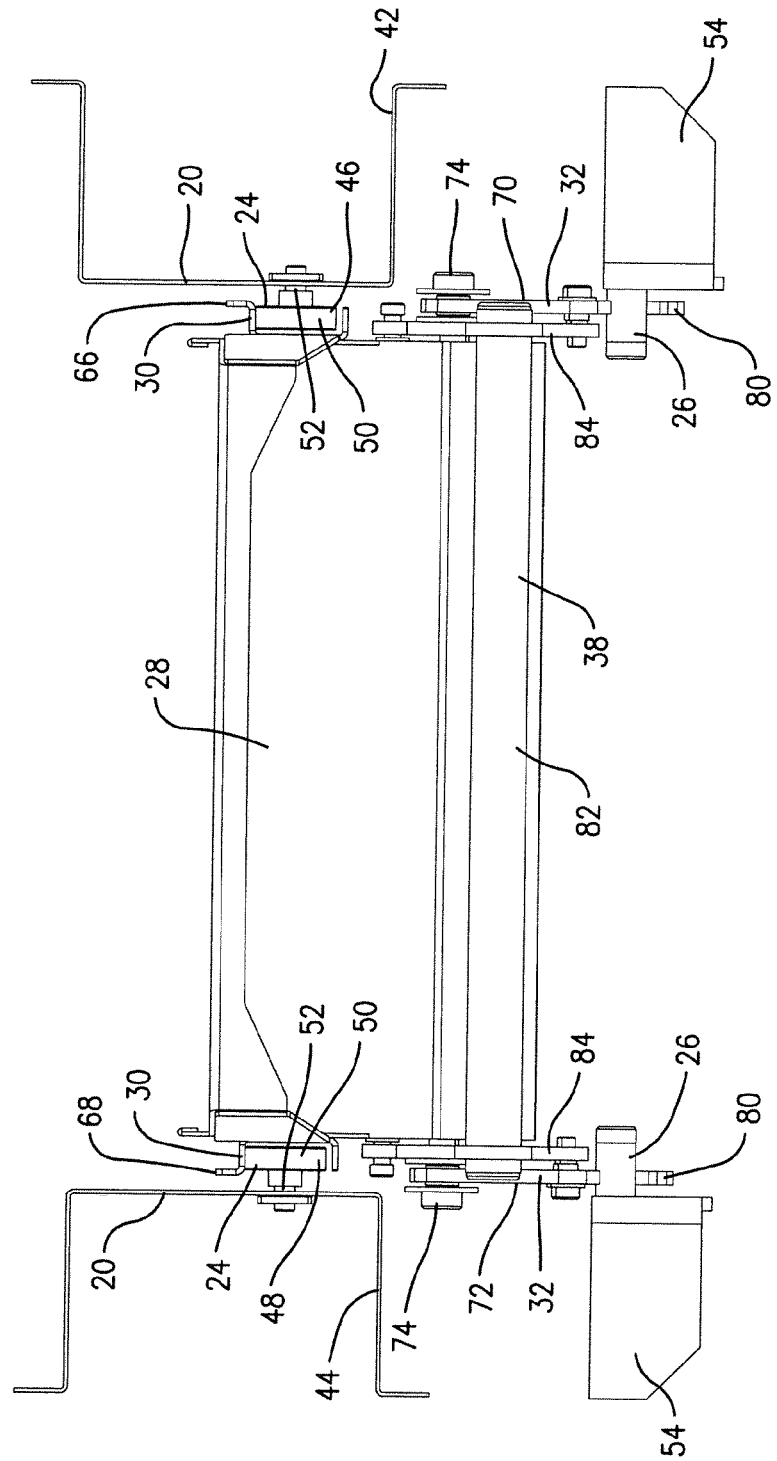
FIG. 7 is a side view of the drawer assembly of FIG. 5 illustrated engaging the frame assembly of FIG. 4.
Figure 8:
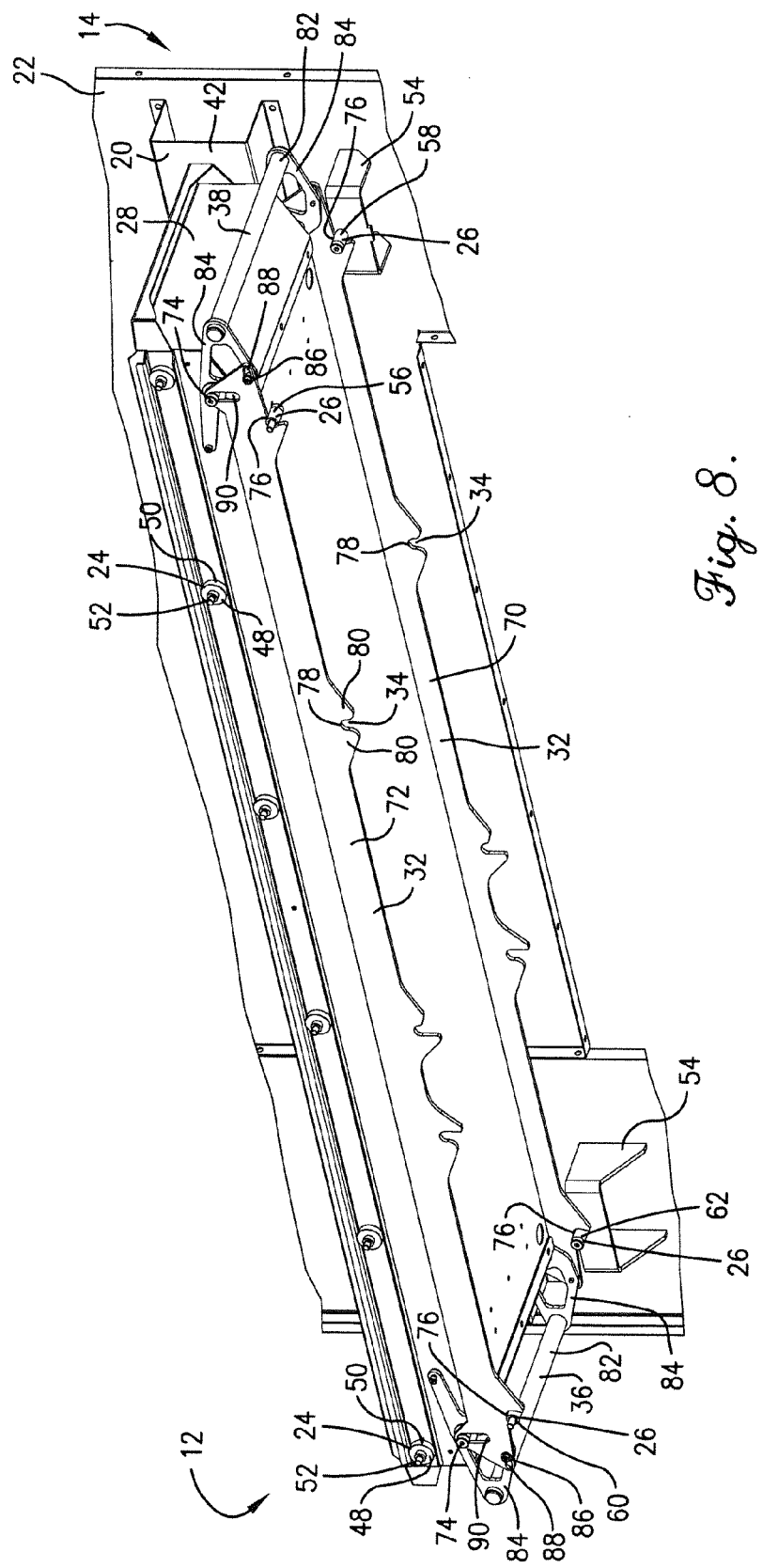
FIG. 8 is a is a bottom viewing fragmented perspective of the drawer assembly of FIG. 5 illustrated engaging the frame assembly of FIG. 4.

As illustrated in FIGS. 2-3, embodiments of the present invention include a drawer system for use on a utility vehicle, with the drawer system generally comprising (1) a track assembly 16 attached to the vehicle, and (2) a drawer assembly 18 translationally attached to the track assembly. As best illustrated in FIG. 4, the track assembly 16 broadly includes one or more brackets 20 attached to a frame 22 of the vehicle; a plurality of track rollers 24 attached to the one or more brackets 20; and one or more fixed stops 26 attached to the frame of the vehicle. As illustrated in FIG. 5, the drawer assembly 18 broadly includes a drawer 28 that is positioned transversely across a width of the vehicle; one or more track rails 30 attached to the drawer and generally aligned with the plurality of track rollers 24 of the track assembly 16; one or more latch bars 32 attached to the sides of the drawer and each including a plurality of catch points 34 for engaging with the one or more fixed stops 26 of the track assembly 16; a driver's side latch handle 36 attached to the one more latch bars near a driver's side end of the drawer; and a passenger's side latch handle 38 attached to the one or more latch bars near a passenger's side end of the drawer. As best illustrated by FIGS. 6-8, the plurality of track rollers 24 of the track assembly 16 are generally aligned and interfit with the one or more track rails 30 of the drawer assembly 18 to facilitate the lateral extension of the drawer 28 from both sides of the vehicle, such that a user can access the drawer, and its contents from either side of the vehicle. In addition, the one or more latch bars 32 and the one or more fixed stops 26 facilitate the drawer to be secured in a plurality of levels of extension from either side of the vehicle, hereinafter referred to as extension positions.

Remaining with FIGS. 6-8 and beginning with the track assembly 16, embodiments of the present invention may provide for the one or more brackets 20 to include two brackets that are generally elongated and u-shaped. In such an embodiment, a front bracket 42 is attached to a forward positioned frame of the vehicle. Similarly, a rear bracket 44 (See FIG. 7) is attached to a rearward positioned frame of the vehicle. The brackets may be attached to the frame 22 of the vehicle via welding, rivets, fasteners, or the like. In certain embodiments, the front and rear brackets are made from aluminum or steel. However, the brackets may be made from other materials with sufficient strength and durability to provide support of and operability for the drawer of embodiments of the present invention.

Track rollers included in the plurality of track rollers 24 are attached to each of the front bracket 42 and the rear bracket 44. As best illustrated by FIG. 7, a front group 46 of track rollers is attached to the front bracket 42, and a rear group 48 of track rollers is attached to the rear bracket 44. Each track roller in the plurality of track rollers 24 includes a wheel 50 and an axle 52 around which the wheel is free to rotate. In certain embodiments, each track roller may include a plurality of bearings (not shown) to facilitate efficient rotation of the wheel with respect to the axle. The track rollers 24 are attached to the brackets 42, 44 via free ends of their respective axles 52, with the wheels 50 of the track rollers 24 orientated away from their respective brackets. The track rollers 24 may be attached to the brackets 42, 44 via welding, adhesive bonding, fasteners, or the like. The axles 52 of the track rollers 24 may be made from aluminum or steel, or other material suitable for providing support to embodiments of the present invention. The wheels 50 of the track rollers 24 may similarly be made from steel or aluminum, but they may additionally be made from high-strength non-metals, such as ABS or fortified vinyl, rubber or the like. In certain embodiments, the front and rear groups of track rollers 46, 48 may each include five or more individual track rollers. However, the number of rollers may vary depending on the operability requirements of the drawer of embodiments of the present invention, including requirements to facilitate movement of the drawer across a transverse width of the vehicle.

The one or more fixed stops 26 of the track assembly 16 generally include a cylindrically-shaped piece of aluminum or steel that is attached to the frame 22 of the vehicle via welding, adhesive bonding, fasteners, or the like. In other embodiments, the one or more fixed stops 26 may not be directly connected to the frame 22 of the vehicle, but may be indirectly connected to the frame via one or more small brackets 54 (See FIG. 8). In certain embodiments, the one or more fixed stops 26 may be made from high-strength non metals such as ABS or fortified vinyl, rubber, or the like. The one or more fixed stops 26 project away from the frame 22 of the vehicle and provide a latching stop for the drawer 28 of embodiments of the present invention, as will be discussed in more detail below. In certain embodiments of the present invention, the number of one or more fixed stops 26 may be four. In such an embodiment and as best illustrated by FIG. 8, a first fixed stop 56 is positioned rearward on the passenger's side 14 of the vehicle; a second fixed stop 58 is positioned forward on the passenger's side 14 of the vehicle; a third fixed stop 60 is positioned rearward on the driver's side 12 of the vehicle; and a fourth fixed stop 62 is positioned forward on the driver's side 12 of the vehicle. The inclusion of four fixed stops facilitates the secure latching of the drawer 28 in various levels of extension out of both the driver's and passenger's sides 12, 14 of the vehicle, as will be discussed in more detail below.

Remaining with FIGS. 6-8 and turning now to the drawer assembly 18, the drawer 28 is positioned transversely across the width of the vehicle and, in certain embodiments, may be aligned between the front and rear brackets 42, 44. Embodiments of the present invention may provide for the drawer 28 to be nearly the same length as the width of the vehicle, such that drawer spans nearly the entire transverse width of the vehicle. It should be appreciated that embodiments of the present invention may provide for the size of the drawer 28 to be shorter or longer than the transverse width of the vehicle; however, because an object of the present invention is to provide for a drawer 28 that can be accessed from either side of the vehicle, it is beneficial for the length of the drawer to be nearly the same as the width of the vehicle. The drawer 28 may be made from aluminum, steel, or other material of sufficient strength and durability to store and carry construction equipment, tools, and material. In addition, the drawer 28 may include a single compartment or a plurality of compartments in which various pieces of equipment, tools, and material may be stored and carried.

The drawer assembly 18 includes one or more track rails 30 that are attached to the drawer 28 and are generally aligned with the plurality of track rollers 24 of the track assembly 16. The track rails 30 are generally u-shaped pieces of aluminum, steel, or other material of sufficient strength and durability to support the drawers of embodiments of the present invention. In certain embodiments there are two track rails, which are each attached to a side of the drawer 28. As best illustrated by FIG. 7, a front track rail 66 is attached to an upper portion of a front facing side of the drawer 28, and a rear track rail 68 is attached to an upper portion of a rear facing side of the drawer 28. The track rails 66, 68 generally extend along the entire length of the drawer 28 and are attached to the drawer via welding, riveting, fasteners, or the like. The wheels 50 from the plurality of track rollers 24 are positioned within a gap presented by the u-shape of the one or more track rails 30, such that the track rails 30 bear down on the wheels 50. In such a configuration, the drawer 28 slides along the plurality of track rollers 24, via the track rails 30, and is thus capable of extending and retracting from both the driver's side 12 and passenger's side 14 of the vehicle.

Referring to FIGS. 7-8, the one or more latch bars 32 of the drawer assembly 18 are attached to the front and rear facing sides of the drawer 28 and are generally made from a thin, generally rectangular piece of aluminum, steel, or other material of sufficient strength and durability to support repetitive movement and latching of the drawer 28 of embodiments of the present invention. In certain embodiments, there are two latch bars; however, embodiments of the present invention contemplate the use of more or less than two latch bars as may be required. In embodiments with two latch bars and as best illustrated by FIG. 8, a front latch bar 70 may be attached to a lower portion of the front facing side of the drawer, and a rear latch bar 72 may be attached to a lower portion of the rear facing side of the drawer. The latch bars 32 attach to the drawer via loosely secured fasteners 74 located at each end of each of the latch bars. The loosely secured fasteners 74 provide enough clearance between the latch bars 32 and the drawer 28 for a portion of a latch handle, which is described in more detail below, to also be connected to the loosely secured fasteners between the latch bars and the drawer.

As illustrated in FIGS. 6-8, the plurality of catch points 34 of the one or more latch bars 32 is positioned at a bottom of each of the latch bars along the bars' length. The plurality of catch points 34 may include exterior catch points 76 and interior catch points 78. The exterior catch points 76 are positioned near the ends of the latch bars 32. The latch bars 32 include lowered projections, hereinafter referred to as lips 80, which extend below the bottoms of the latch bars, adjacent to the catch points. For exterior catch points 76, a single lip 80 may be positioned next to an interior facing side of the catch points. As will be discussed in more detail below, the exterior catch points 76 serve to secure the drawer 28 in place while the drawer is in a fully retracted or closed position.

In contrast, the interior catch points 78 serve to secure the drawer 28 in a plurality of extension positions. In more detail, for interior catch points 78, two lips 80 may surround an arcuate cut-out to form a single catch point. The arcuate cut-out is slotted, such that it has a closed end formed by the latch bar and an open end for receipt of the fixed stop there through. A distance between the two lips 80 (and therefore, a width of the arcuate cut-out) dictates a corresponding diameter or width of the fixed stops 26. As such, the fixed stops 26 are sized to be received within the interior catch points 78 when the catch points and fixed stops are aligned. In certain embodiments, there may be three interior catch points 78, such that the drawer 28 may extend from a fully retracted position to three unique extension positions. However, embodiments of the present invention contemplate the use of any number of interior catch points to facilitate the extension of the drawer to any required number of extension positions.

The drawer assembly 18 includes two latch handles positioned at the ends of the drawer, including the driver's side latch handle 36 and the passenger's side latch handle 38. Each latch handle includes a cylindrical handle-bar 82 indirectly connected to the one or more latch bars 32 via a latch bracket 84. The handle-bar 82 is attached to the latch bracket 84 via welding, adhesive bonding, or the like. The latch bracket 84 is indirectly attached to the one or more latch bars 32 via the loosely secured fastener 74 and is directly attached to the one or more latch bars 32 via a slidable fastener 86. The slidable fastener 86 is securely attached to the latch bracket 84 and functions to slide along a horizontal opening or slot 88 formed at the ends of the latch bars 32. The latch bars 32 additionally include a vertical opening or slot 90 positioned adjacent to the loosely secured fastener 74, such that the latch bars can travel in a vertical direction with respect to the drawer 28. In embodiments that incorporate two latch bars, the handle-bar 82 may extend across the width of the drawer 28 and connect the ends of the latch bars 32 via the latch brackets 84 attached to each of the latch bars.

Figure 9:
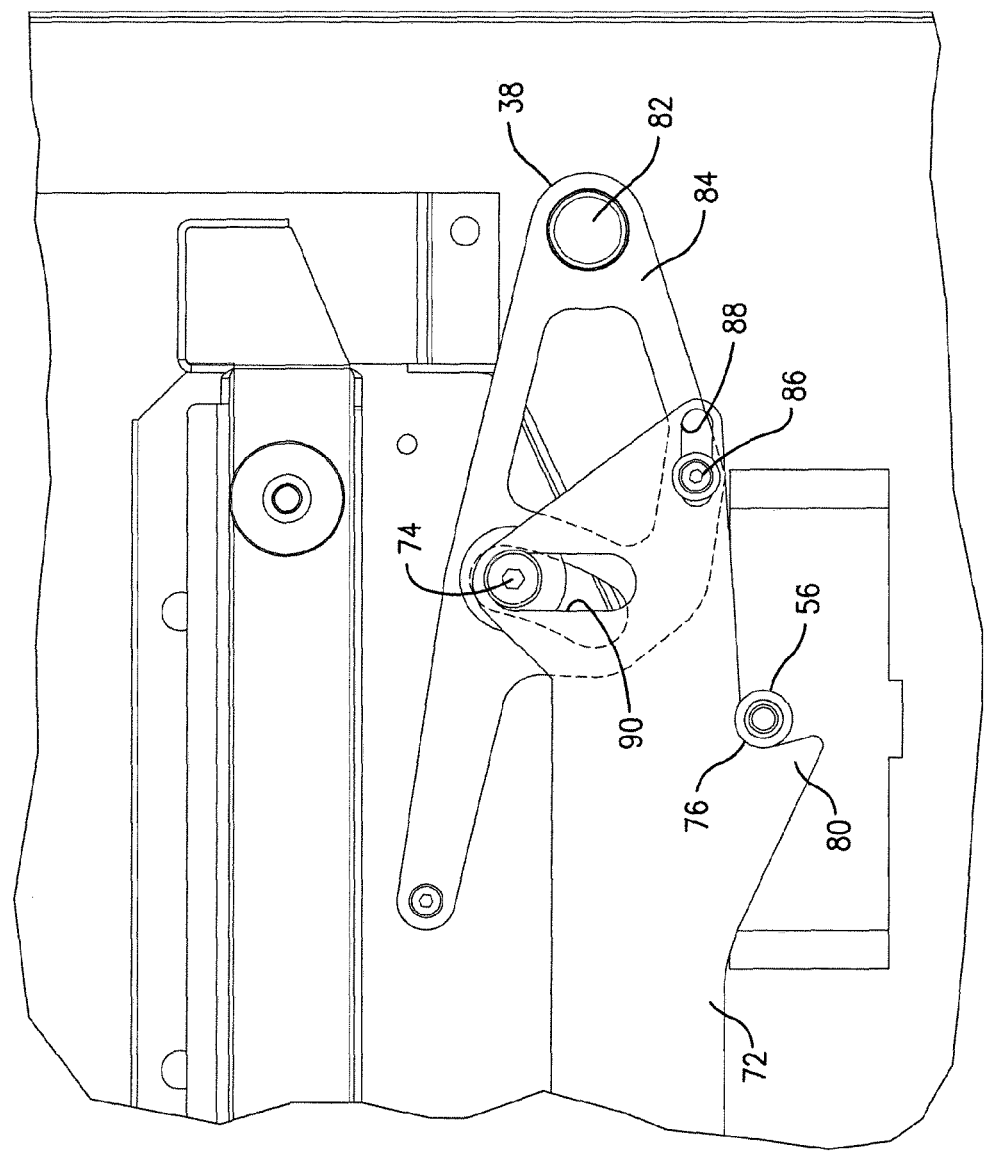
FIG. 9 is a is a partial perspective view of the drawer assembly of FIG. 5, illustrating a latch handle and a latch bar of the drawer assembly.

In operation, embodiments of the present invention provide for the drawer 28 to extend from its fully retracted position to a plurality of extension positions. The following illustrations are described with reference to embodiments of the present invention that include a drawer system with four fixed stops and two latch bars, with each latch bar having five catch points. During vehicle transport, the drawer 28 is ideally positioned in the fully retracted position, as illustrated by FIG. 8. In such a retracted position, the drawer is secured in place by the engagement of each of the four exterior catch points 76 with the fixed stops 56, 58, 60, 62. Once the vehicle is stationary, a user of embodiments of the present invention may extend the drawer 28 from either side of the vehicle to one of the plurality of extension positions. To extend the drawer 28 from its fully retracted position, the user pulls up on one of the latch handles 36, 38 on the side of the vehicle from which the user desires to access the drawer. Pulling up on one of the latch handles 36, 38 disengages the corresponding exterior catch points 76 of the latch bars 32 (on the side of the vehicle from which the user wishes to access the drawer 28) from the fixed stops 26, and the user may then pull the drawer out away from the vehicle to an extension position. For example, and as best illustrated by FIG. 9, when a user lifts up on passenger's side latch handle 38, the latch handle's slidable fasteners 86 travel in an exterior direction through the horizontal openings 90 on the latch bars 70, 72. As the user continues to lift latch handle 38, the latch brackets 84 rotate around the loosely secured fasteners 74, and the slidable fasteners 86 continue to travel along the horizontal openings 90 until they have traveled the entire length of the horizontal openings. Upon traveling the entire length of the horizontal openings 90, the slidable fasteners force the latch bars 70, 72 to move in an upward direction. As the latch bars 70, 72 move upward, the vertical openings 90 of the latch bars travel by the loosely secured fasteners 74. The latch bars 70, 72 will continue to travel upward until a lowermost portion of the vertical openings 90 contacts the loosely secured fasteners 74. At such a point, the lips 80 of the latch bars 70, 72 are lifted above the fixed stops 56, 58, such that the catch points 76 are disengaged from the first and second fixed stops 56, 58. Thereafter, the drawer 28 is free to be pulled or extended to an extension position.

As described above, the number of extension positions is dependent on the number of interior catch points 78 included on the latch bars 32. Embodiments of the present invention contemplate the use of any number of interior catch points 78; however, for illustrative purposes, the number of interior catch points described in the following embodiments is three. As will be described in more detail below, using latch bars 32 with three interior catch points 78, and specifically with two interior catch points on the driver's side of the latch bars and one interior catch point on the passenger's side of the latch bars, the drawer 28 can be extended out further on the passenger's side 14 of the vehicle than on the driver's side 12. Such an embodiment may be beneficial when accessing the drawer 28 while the vehicle is parked on a street because it may be dangerous to extend the drawer 28 too far in the direction of the street.

Figure 10:
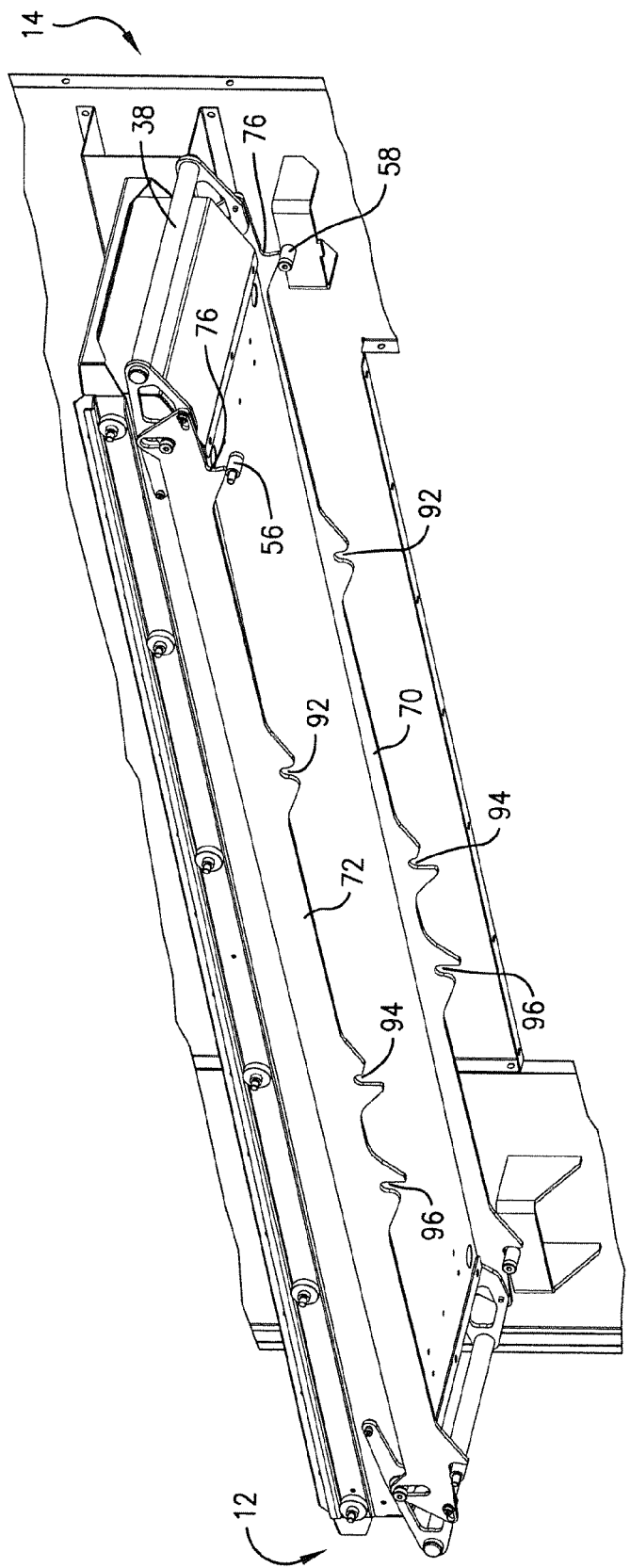
FIG. 10 is a is a bottom viewing fragmented perspective of the drawer assembly of FIG. 5 engaged with the frame assembly of FIG. 4, illustrating the drawer disengaging from fixed stops of the frame assembly.

In embodiments that include front and rear latch bars 70, 72 and three interior catch points 78 on each of the latch bars, the catch points may facilitate a greater extension of the drawer out of one side of the vehicle as opposed to the other. For instance, as illustrated by FIG. 10, the latch bars 70, 72 may include passenger's side intermediate catch points 92 positioned approximately one-third of the length of the drawer 28 from the passenger's side end of the drawer; passenger's side fully open catch points 94 positioned near, but a small distance short, of two-thirds of the length of the drawer from the passenger's side end of the drawer; and driver's side intermediate catch points 96 positioned approximately one-third of the length of the drawer from the driver's side end of the drawer. However, such position distances are provided purely for exemplary purposes, and the position distances can be selected as necessary to provide for the drawer 28 to be extended to required extension positions. For example, the passenger's side intermediate catch points 92 may be positioned between approximately one-tenth to approximately one-half of the length of the drawer from the passenger's side end of the drawer. In addition, the passenger's side fully open catch points 94 may be positioned between approximately one-half to approximately nine-tenths of the length of the drawer 28 from the passenger's side end of the drawer. And finally, the driver's side intermediate catch points 96 may be positioned between approximately one-tenth to approximately one-half of the length of the drawer from the driver's side end of the drawer. Thus, embodiments of the present invention contemplate a wide variation in the positioning of the interior catch points 78, such that the interior catch points may be positioned as needed to ensure that the drawer 28 can be extended to precise extension positions out of both the driver's and passenger's sides of the vehicle 12, 14.

Figure 11:
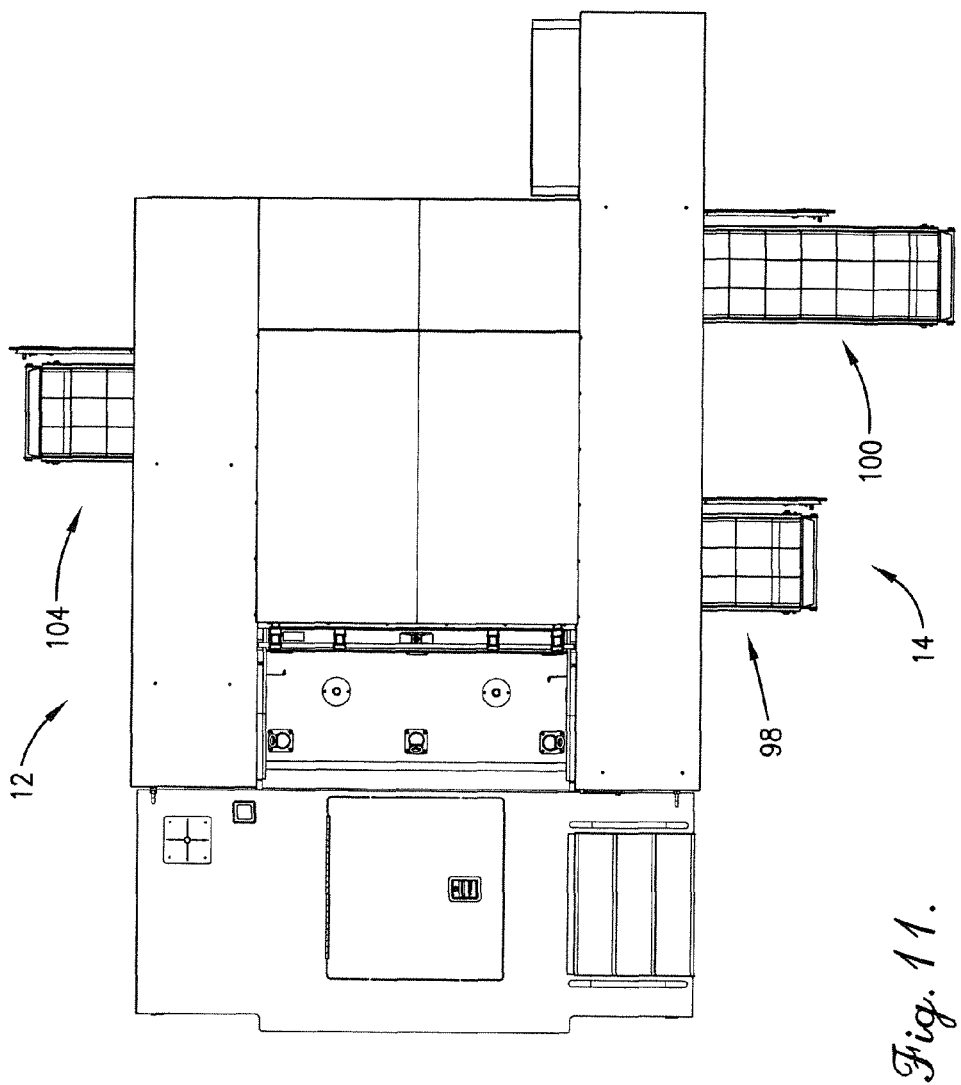
FIG. 11 is a plan view of an exemplary utility vehicle equipped with a tool compartment, illustrating a drawer system's plurality of levels of extension.
Figure 12:
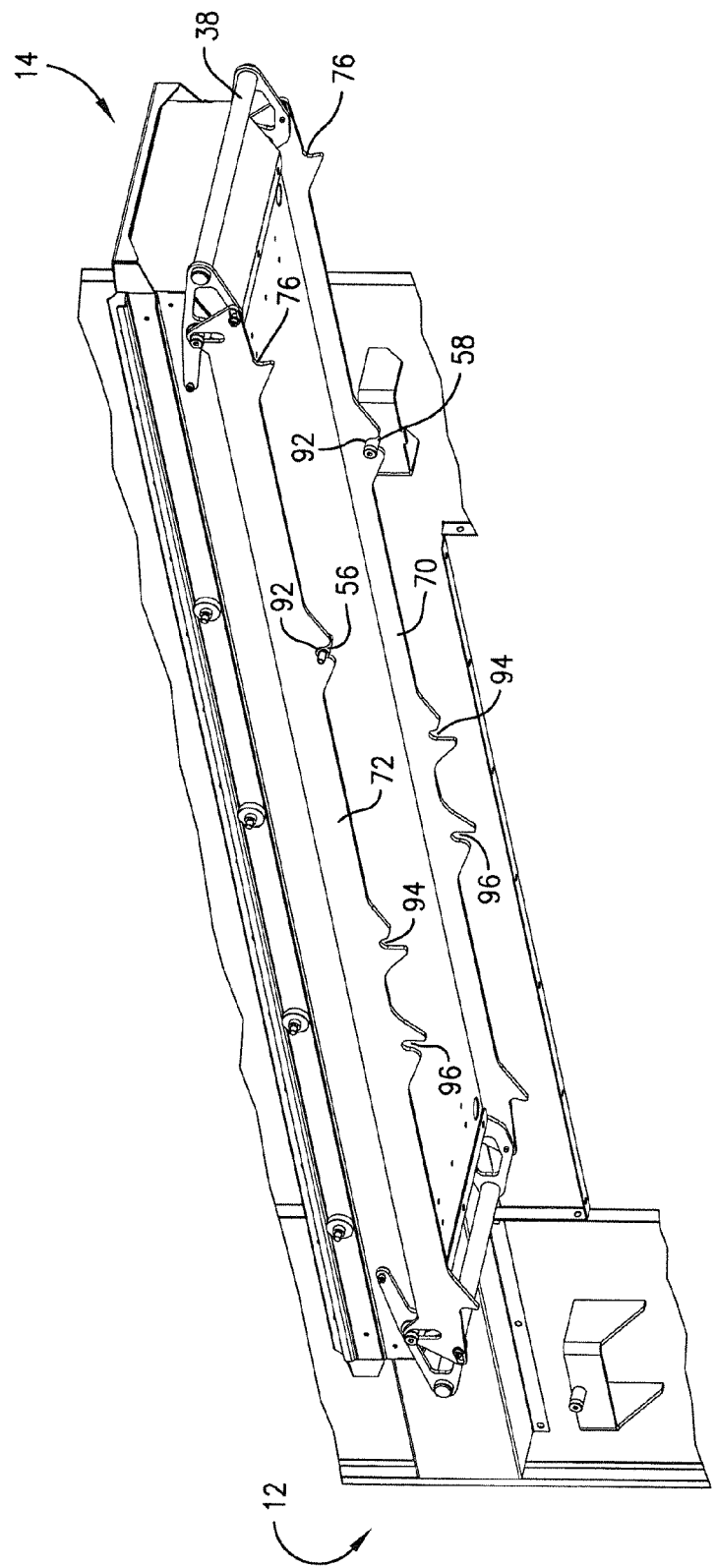
FIG. 12 is a is a bottom viewing fragmented perspective of the drawer assembly of FIG. 5 engaged with the frame assembly of FIG. 4, illustrating the drawer extending to a passenger's side intermediate position.
Figure 13:
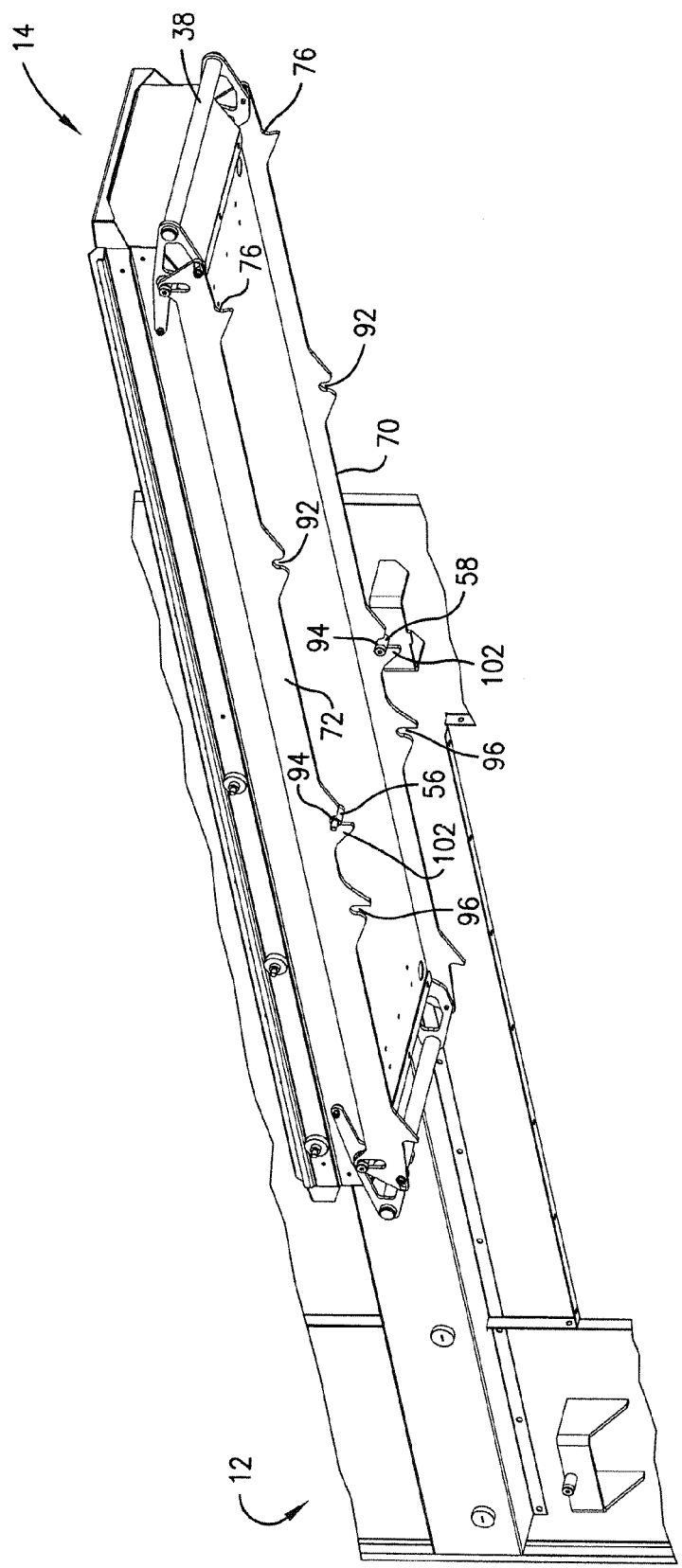
FIG. 13 is a is a bottom viewing fragmented perspective of the drawer assembly of FIG. 5 engaged with the frame assembly of FIG. 4, illustrating the drawer extending to a passenger's fully open position.

In embodiments with three interior catch points 78, as described above, the user may lift up on the passenger's side latch handle 38, disengaging the exterior catch points 76 on the passenger's side of the vehicle with the first and second fixed stops 56, 58. As illustrated by FIG. 11, the user may then extend the drawer out the passenger's side of the vehicle to a passenger's side intermediate position 98. The passenger's side intermediate position 98 corresponds to the alignment of the passenger's side intermediate catch points 92 with the first and second fixed stops 56, 58, as illustrated by FIG. 12. If the user desires to extend the drawer further, the user may lift up on the passenger's side latch handle 38, disengaging the passenger's side intermediate catch points 92 with the first and second fixed stops 56, 58, and extend the drawer to a passenger's side fully extended position 100 (See FIG. 11). As illustrated in FIG. 13, the passenger's side fully extended position corresponds to the alignment of the passenger's side fully open catch points 94 with the first and second fixed stops 56, 58. It should be noted that embodiments of the present invention may provide for pronounced lips 102 to be positioned adjacent to those catch points corresponding to a maximum drawer extension. The pronounced lips extend down below a bottom of the latch bars to such an extent that the latch bars cannot be extended past the fixed stops, thus ensuring that the drawer cannot extend out beyond the maximum drawer extension. For instance, as illustrated in FIG. 13, pronounced lips 102 may be formed on a side of the catch points 94 that are facing the driver's side of the vehicle 12, such that drawer 28 cannot extend out the passenger's side of the vehicle 14 beyond where the passenger's side fully open catch points 94 are aligned with the first and second fixed stops 56, 58.

Figure 14:
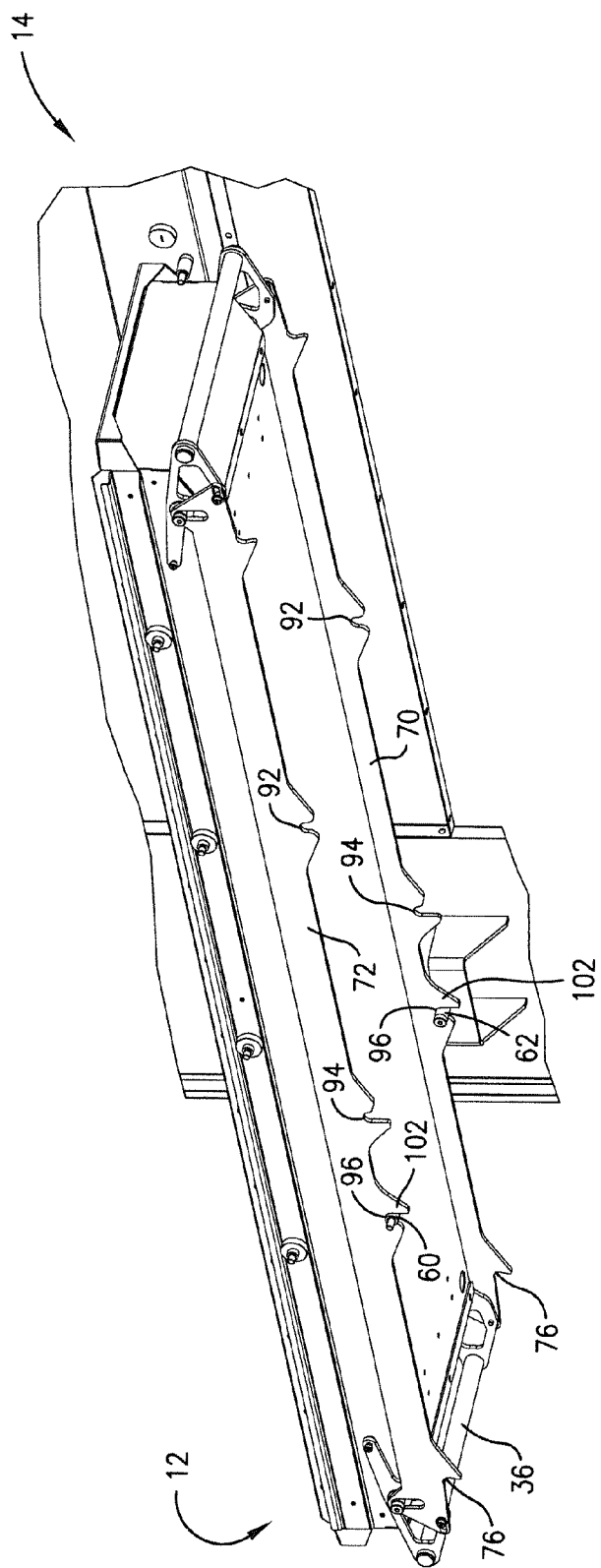
FIG. 14 is a is a bottom viewing fragmented perspective of the drawer assembly of FIG. 5 engaged with the frame assembly of FIG. 4, illustrating the drawer extending to a driver's side intermediate position.

Starting again with the drawer 28 in the fully retracted or closed position (See FIG. 8), the user may also extend the drawer 28 out of the driver's side of the vehicle 12. To begin, the user lifts on the driver's side latch handle 36, disengaging the exterior catch points 76 from the third and fourth fixed stops 60, 62, and thereafter can extend the drawer out from the fully retracted position. The drawer 28 may be extended out to a driver's side intermediate position 104 (See FIG. 11) from the driver's side of the vehicle 12 until the driver's side intermediate catch points 96 are aligned with and engaged with the third and fourth fixed stops 60, 62 (See FIG. 14). In certain embodiments, the driver's side intermediate catch points 96 may include pronounced lips 102 positioned on a side of the catch points 96 that are facing the passenger's side of the vehicle 14, such that the drawer 28 cannot extend further out the driver's side of the vehicle than the driver's side intermediate distance 104. Such a restriction may be beneficial for a user of the present invention using the drawer system while parked on a street used by other vehicles and pedestrians. By restricting the distance that the drawer may extend out the driver's side of the vehicle, the user can ensure that the drawer will not interfere with other vehicles and/or pedestrians accessing a road or street. If the user needs to access tools or equipment located within an interior portion of the drawer, then the user can fully extend the drawer out from the passenger's side of the vehicle.

Embodiments of the present invention provide further benefits when the vehicle is parked in plurality of orientations or inclines. The engagement of the catch points with the fixed stops ensures that the drawer will remain securely positioned in either its fully retracted position or in one of its extension positions, until such time as the user lifts on the handle, disengaging the catch points from the fixed stops. Thus, even when the vehicle is parked on an incline, the drawer is securely held in place, such that it will not unintentionally extend or retract from either a fully retracted or extension position.

Although the invention has been described with reference to the exemplary embodiments illustrated in the attached drawings, it is noted that equivalents may be employed and substitutions made herein without departing from the scope of the invention as recited in the claims. For example, embodiments illustrated above included three interior catch points; however, embodiments of the present invention may include any number and positions of catch points to facilitate various levels of extension of the drawer. Furthermore, the embodiments described above included certain numbers and styles of drawer system components, such as track rails, track rollers, latch bars, and the like. However, embodiments of the present invention contemplate the use of various numbers and styles of components that are included in a full scope of equivalents that perform substantially the same function in substantially the same way. In even additional embodiments, the drawer system may include a drawer that extends out from only a single side of a vehicle. Such embodiments may include components of the drawer assembly and latch assembly as previously described. However, such components may be modified and/or arranged such that the drawer may extend to various levels of extension from only a single side of the vehicle. For example, such a drawer system may include a latch handle only on the passenger's side of the drawer and may further include only those catch points necessary to extend the drawer out to various levels of extension from the passenger's side of the vehicle. It is understood that such modifications and/or arrangements are purely illustrative and embodiments of the present invention may include further modifications as necessary for the drawer of the drawer system to extend from only a single side of the vehicle.

Having thus described various embodiments of the invention, what is claimed as new and desired to be protected by Letters Patent includes the following:

1. A drawer system for use on a vehicle, the drawer system comprising:
   a track assembly, including—
      one or more brackets attached to a frame of the vehicle,
      a plurality of track rollers attached to the brackets, and
      one or more fixed stops attached to the frame of the vehicle; and
   a drawer assembly, including—
      a drawer extending transversely across generally an entire width of the vehicle, wherein the drawer is configured to extend out both a driver's side and a passenger's side of the vehicle,
      one or more track rails attached to the drawer and positioned adjacent the track rollers of the track assembly, wherein the track rollers and the track rails facilitate the transverse extension and retraction of the drawer with respect to the vehicle, and
      one or more latch bars attached to the drawer, wherein the one or more latch bars include a plurality of catch points,
   wherein the catch points of the one or more latch bars are operable to engage the one or more fixed stops to secure the drawer in one or more preferred positions,
   wherein a driver's side of the one or more latch bars includes at least two of said plurality of catch points,
   wherein a passenger's side of the one or more latch bars includes at least one of said plurality of catch points,
   wherein a location of each of the plurality of catch points relative to a passenger's side and a driver's side of the one or more latch bars enables the drawer to be extended from the passenger's side of the vehicle farther than the drawer is enabled to be extended from the driver's side of the vehicle, such that said at least two of said catch points on the driver's side are positioned between approximately one-tenth to approximately one-half of a length of the drawer from an end of the drawer closest to the driver's side to prevent less than fifty percent extension of the drawer on the driver's side.

2. The drawer system of claim 1, with the drawer assembly further comprising:
   a driver's side latch handle attached to the one or more latch bars at the driver's side of the vehicle and operable to disengage the one or more catch points from the one or more fixed stops; and
   a passenger's side latch handle attached to the one or more latch bars at the passenger's side of the vehicle and operable to disengage the one or more catch points from the one or more fixed stops.

3. The drawer system of claim 1, wherein the one or more latch bars includes two parallel latch bars, with a first latch bar attached to a side of the drawer facing a rear of the vehicle, and a second latch bar attached to a side of the drawer facing a front of the vehicle.

4. The drawer system of claim 3, wherein the first latch bar and the second latch bar each include five catch points, with each catch point from the first latch bar aligning with a catch point from the second latch bar.

5. The drawer system of claim 1, wherein the one or more fixed stops includes four fixed stops, including—
   a first fixed stop positioned on the passenger's side of the vehicle, towards the rear of the vehicle;
   a second fixed stop positioned on the passenger's side of the vehicle, towards the front of the vehicle;
   a third fixed stop positioned on the driver's side of the vehicle, towards the rear of the vehicle; and
   a fourth fixed stop positioned on the driver's side of the vehicle, towards the front of the vehicle.

6. A drawer system for use on a vehicle, the drawer system comprising:
   a track assembly, including—
      one or more brackets attached to a frame of the vehicle,
      a plurality of track rollers attached to the brackets, and
      one or more fixed stops attached to the frame of the vehicle; and a drawer assembly, including—
   a drawer extending transversely across generally an entire width of the vehicle, wherein the drawer is configured to extend out both a driver's side and a passenger's side of the vehicle,
   at least two track rails attached lengthwise to sides of the drawer and positioned adjacent to the track rollers of the track assembly, wherein the track rollers and the track rails facilitate the transverse extension and retraction of the drawer with respect to the vehicle, and
   one or more latch bars attached lengthwise to the sides of the drawer, wherein the one or more latch bars include a plurality of catch points,
wherein the catch points of the one or more latch bars are operable to engage the one or more fixed stops to secure the drawer in one or more preferred positions,
wherein a location of each of the plurality of catch points relative to a passenger's side and a driver's side of the one or more latch bars enables the drawer to be extended from the passenger's side of the vehicle farther than the drawer is enabled to be extended from the driver's side of the vehicle,
wherein the plurality of catch points facilitate the drawer to be extended further away from the vehicle on the passenger's side of the vehicle than on the driver's side of the vehicle, such that the plurality of catch points on the driver's side are positioned between approximately one-tenth to approximately one-half of a length of the drawer from an end of the drawer closest to the driver's side to prevent less than fifty percent extension of the drawer on the driver's side.

7. The drawer system of claim 6, with the drawer assembly further comprising:
   a driver's side latch handle attached to the one or more latch bars at the driver's side of the vehicle and operable to disengage the one or more catch points from the one or more fixed stops; and
   a passenger's side latch handle attached to the one or more latch bars at the passenger's side of the vehicle and operable to disengage the one or more catch points from the one or more fixed stops.

8. The drawer system of claim 6, wherein the one or more latch bars includes two parallel latch bars, with a first latch bar attached to a side of the drawer facing a rear of the vehicle, and a second latch bar attached to a side of the drawer facing a front of the vehicle.

9. The drawer system of claim 8, wherein the first latch bar and the second latch bar each include five catch points, with each catch point from the first latch bar aligning with a catch point from the second latch bar.

10. The drawer system of claim 6, wherein the one or more fixed stops includes four fixed stops, including—
   a first fixed stop positioned on the passenger's side of the vehicle, towards the rear of the vehicle;
   a second fixed stop positioned on the passenger's side of the vehicle, towards the front of the vehicle;
   a third fixed stop positioned on the driver's side of the vehicle, towards the rear of the vehicle; and
   a fourth fixed stop positioned on the driver's side of the vehicle, towards the front of the vehicle.

11. A method of using a vehicle drawer system that includes a drawer assembly with a drawer that is extendable out of both a driver's side and a passenger's side of a vehicle, the method comprising the steps of:
   disengaging the drawer assembly from a track assembly of the drawer system;
   pulling a passenger's side end of the drawer to extend the drawer from a fully retracted position out the passenger's side of the vehicle to a first passenger-side preferred position;
   upon reaching the first passenger-side preferred position, engaging the drawer assembly with the track assembly to secure the drawer in the first passenger-side preferred position;
   disengaging the drawer assembly from the track assembly of the drawer system;
   pushing the passenger's side end of the drawer to retract the drawer from the first passenger-side preferred position to the fully retracted position;
   upon reaching the fully retracted position, engaging the drawer assembly with the track assembly to secure the drawer in the fully retracted position;
   disengaging the drawer assembly from the track assembly of the drawer system;
   pulling the driver's side end of the drawer to extend the drawer from the fully retracted position out the driver's side of the vehicle to a first driver-side preferred position; and
   upon reaching the first driver-side preferred position, engaging the drawer assembly with the track assembly to secure the drawer in the first driver-side preferred position,
   wherein the first passenger-side preferred position is configured to extend farther from the vehicle than the first driver-side preferred position to prevent less than fifty percent extension of the drawer on the driver's side.

12. The method of claim 11, further comprising the steps of:
   disengaging the drawer assembly from the track assembly of the drawer system;
   pushing the driver's side end of the drawer to retract the drawer from the first driver-side preferred position to the fully retracted position;
   upon reaching the fully retracted position, engaging the drawer assembly with the track assembly to secure the drawer in the fully retracted position;
   disengaging the drawer assembly from the track assembly of the drawer system;
   pulling a passenger's side end of the drawer to extend the drawer from a fully retracted position out the passenger's side of the vehicle to a second passenger-side preferred position; and
   upon reaching the second passenger-side preferred position, engaging the drawer assembly with the track assembly to secure the drawer in the second passenger-side preferred position,
   wherein an extension of the drawer is lesser in the second passenger-side preferred position than in the first passenger-side preferred positions.

\* \* \* \* \*